US006124683A

United States Patent [19]
Olsen et al.

[11] Patent Number: 6,124,683
[45] Date of Patent: Sep. 26, 2000

[54] SYSTEM FOR AND METHOD OF OPERATING A MERCURY FREE DISCHARGE LAMP

[75] Inventors: Joseph A. Olsen, Rockport; Warren P. Moskowitz, Ipswich; P. Bruce Newell, Carlisle; Nanu Brates, Malden, all of Mass.

[73] Assignee: Osram Sylvania Inc., Danvers, Mass.

[21] Appl. No.: 09/414,364

[22] Filed: Oct. 7, 1999

Related U.S. Application Data

[60] Provisional application No. 60/129,200, Apr. 14, 1999.

[51] Int. Cl.[7] ........................................................ G05F 1/00
[52] U.S. Cl. ............................ 315/291; 315/246; 313/637
[58] Field of Search ...................................... 315/291, 307, 315/246, 287, 209 R, 248, 326; 313/637, 638, 640–642

[56] References Cited

U.S. PATENT DOCUMENTS

| | | | |
|---|---|---|---|
| 4,480,213 | 10/1984 | Lapatovich et al. | 315/248 |
| 4,492,898 | 1/1985 | Lapatovich et al. | 315/248 |
| 4,636,692 | 1/1987 | Lapatovich et al. | 315/248 |
| 4,647,821 | 3/1987 | Lapatovich et al. | 315/248 |
| 4,850,918 | 7/1989 | English et al. | 445/40 |
| 5,047,695 | 9/1991 | Allen et al. | 315/291 |
| 5,134,345 | 7/1992 | El-Hamamsy et al. | 315/248 |
| 5,198,727 | 3/1993 | Allen et al. | 315/291 |
| 5,306,987 | 4/1994 | Dakin et al. | 315/248 |
| 5,363,015 | 11/1994 | Dakin et al. | 315/638 |
| 5,365,151 | 11/1994 | Spiegel et al. | 315/209 R |
| 5,394,057 | 2/1995 | Russell et al. | 315/635 |
| 5,436,533 | 7/1995 | Fromm et al. | 315/246 |
| 5,479,072 | 12/1995 | Dakin et al. | 315/638 |
| 5,483,126 | 1/1996 | Boenigk et al. | 315/307 |
| 5,508,592 | 4/1996 | Lapatovich et al. | 315/248 |
| 5,523,655 | 6/1996 | Jennato et al. | 315/246 |
| 5,565,741 | 10/1996 | Jennato et al. | 315/246 |
| 5,666,031 | 9/1997 | Jennato et al. | 315/246 |
| 5,684,367 | 11/1997 | Moskowitz et al. | 315/246 |
| 5,773,937 | 6/1998 | Miyazaki et al. | 315/246 |
| 5,880,561 | 3/1999 | Miyazaki et al. | 315/209 R |

FOREIGN PATENT DOCUMENTS

| | | |
|---|---|---|
| 0539861 A1 | 8/1991 | European Pat. Off. . |
| 0507533 A2 | 10/1992 | European Pat. Off. . |
| 0744883 A1 | 11/1996 | European Pat. Off. . |
| 0 906 003 A2 | 9/1998 | European Pat. Off. . |

OTHER PUBLICATIONS

Stromberg et al., Excitation of Acoustic Instabilities in Discharge Lamps with Pulsed Supply Voltage, *Lighting Research & Technology*, v.15, N.3 127–132 (1983).

*Primary Examiner*—Haissa Philogene
*Attorney, Agent, or Firm*—Robert F. Clark

[57] ABSTRACT

A system and method for the operation of a mercury free high intensity discharge lamp is disclosed which provides lamp longevity and improved photometric results regardless of the orientation of the lamp. To this end, an acoustically modulated ballast without off-time and low power time is supplied to the lamp.

18 Claims, 7 Drawing Sheets

SYSTEM FOR AND METHOD OF OPERATING A MERCURY FREE DISCHARGE LAMP

CROSS REFERENCES TO RELATED APPLICATIONS

This application claims the benefit of U.S. Provisional Application 60/129,200, filed Apr. 14, 1999.

TECHNICAL FIELD

The present invention relates to a system for and method of operating a discharge lamp, and more particularly, to a system and method whereby a mercury free discharge lamp having improved color, efficacy and longevity may be operated in any orientation without change in its electrical characteristics or light output.

BACKGROUND ART

Metal halide lamps in widespread use today evolved from pure mercury arc lamps developed early this century. Mercury is an ideal arc generating medium because it is a liquid with a low vapor pressure at room temperature which makes it is relatively easy to strike and sustain an arc. At lamp operating temperatures, the mercury pressure becomes quite high and the voltage across the lamp increases to the point where cost effective, efficient power supplies can be used to drive the lamp. Metal halide salts are added to improve the spectral properties of the mercury discharge thereby making the metal halide lamp more efficacious.

The use of mercury in metal halide lamps presents well known environmental concerns. In response, industry has attempted to provide mercury free lamps. However, previous attempts at lighting systems which include mercury free lamps have presented many problems. For example, some mercury free lighting systems have incurred poor efficacy, color and light characteristics. Moreover, previous mercury free lamps have been restricted to operating conditions wherein the lamp must be positioned horizontally. In particular, the tubular lamps tend to restrict convection and, consequently, chemical mixing in the lamp. When operated horizontally, this is not a problem because the chemicals eventually diffuse uniformly throughout the lamp. However, when the lamp operates vertically, gravity causes the chemicals to collect at the bottom of the lamp. This causes an undesirable color variation along the length of the lamp and a temperature non-uniformity that greatly reduces lamp life. Efforts to improve efficacy and color have met some success yet such improved mercury free lamps can only be operated in a horizontal orientation.

Many efforts have been made to provide a mercury free lamp which overcomes the foregoing shortcomings. For example, U.S. Pat. No. 5,394,057 which issued on Feb. 28, 1995 to Russell et al. illustrates the use of a protective coating on mercury free metal halide lamps.

U.S. Pat. No. 5,363,015 which issued on Nov. 8, 1994 to Dakin et al. relates to a lighting system which includes an electrodeless mercury free metal halide lamp. U.S. Pat. No. 5,479,072 which issued on Dec. 26, 1995 to Dakin et al. is of similar interest.

U.S. Pat. No. 5,523,655 which issued on Jun. 4, 1996 to Jennato et al. illustrates a low pressure lighting system which includes a mercury free neon lamp and a pulsed ballast. U.S. Pat. No. 5,565,741 which issued on Oct. 15, 1996 to Jennato et al., and U.S. Pat. No. 5,666,031 which issued on Sep. 9, 1997 to Jennato et al., are of similar interest.

Notwithstanding the foregoing efforts it is still desired to provide an improved lighting system including a mercury free lamp having photometric results which exceed those heretofore achieved and wherein the lamp may be positioned in any desired orientation. Heretofore, there has been a tendency to design lamps and lamp ballasts separately. As a result, when providing lamp systems, such systems have been optimized individually. The result has often been less than optimal. For example, designers of mercury free lamps have not applied acoustic technology to improve the photometric results of such lamps. The present invention meets the foregoing objectives by providing a lighting system which includes a mercury free metal halide lamp and a ballast system having acoustic arc conditioning.

The use of acoustics in lighting systems is well known. For example, in conventional lamp applications provided heretofore efforts have been made to acoustically influence the arc to straighten or otherwise stabilize and center the arc. For example, U.S. Pat. No. 5,134,345 issued on Jul. 28, 1992 to El-Hamamsy et al. illustrates a method of detecting arc instabilities in a High Intensity Discharge (HID) lamp and changing the drive frequencies that cause them thereby avoiding acoustic frequencies that cause destabilizing phenomena.

In U.S. Pat. No. 5,306,987 issued on Apr. 26, 1994 to Dakin et al. reference is made to stabilization of HID lamps by modulating the drive signal with acoustic resonant band frequencies. A similar method of centering the arc in discharge lamps is illustrated in U.S. Pat. No. 5,198,727 which issued on Mar. 30, 1993 to Allen et al. This patent illustrates centering the arc by the "acoustic perturbations" induced by the frequency of the drive signals. Such acoustic perturbations compel the gas or vapor movement patterns within the arc tube to counter the gravity-induced convection.

U.S. Pat. No. 5,684,367 which issued on Nov. 4, 1997 to Moskowitz et al. illustrates a system for and method of operating a discharge lamp, and in particular, of stabilizing and controlling the characteristics of discharge lamps by amplitude-modulating the input AC power wave with a periodic waveform and/or pulse wave to control stabilization and color characteristics. This patent is commonly owned with the instant application and is incorporated herein by reference.

In U.S. Pat. No. 5,047,695 which issued on Sep. 10, 1991 to Allen et al., a method and ballast circuit is illustrated for operating fluorescent, mercury vapor, sodium and metal halide lamps in a DC mode. Power modulation for creating acoustic pressure waves for arc straightening is referred to in this patent. The lamp illustrated therein is operated with a selectable amount of ripple imposed to provide for acoustically straightening the arc between the lamp electrodes. A related patent is the aforementioned U.S. Pat. No. 5,198,727 patent.

U.S. Pat. No. 5,436,533 issued on Jul. 25, 1995 to Fromm et al. illustrates the operation of a standard metal halide lamp with acoustic stabilization.

All of the foregoing acoustic-related patents relate to straightening or otherwise stabilizing and centering the arc in an arc tube in a discharge lamp.

None of such patents relate to mercury free systems or to the use of acoustic modulation to improve photometric output. In contrast, the present inventors have developed a new lighting method and system using acoustic modulation in the operation of a mercury free discharge lamp to provide improved photometric characteristics regardless of lamp orientation. None of the foregoing references illustrate these features.

DISCLOSURE OF THE INVENTION

It is an object of the present invention to provide an improved method of and system for operating a mercury free discharge lamp.

Another object of the present invention is to obviate the disadvantages of the prior art by providing an improved mercury free method of and system for increasing lamp efficacy, color and life.

Yet another object of the present invention is to provide an improved method of and system for operating a mercury free discharge lamp which may be positioned in any orientation including, without limitation, vertical or horizontal.

A further object of the present invention is to provide an improved mercury free lighting system and method wherein the lamp can be operated in any orientation without any change in electrical characteristics, light output, light color and light efficiency.

It is still another object of the present invention to achieve the foregoing objectives using a mercury free metal halide lamp.

This invention achieves these and other objects by providing a system and a method useful in the operation of a mercury free discharge lamp which may be positioned in any orientation. The discharge lamp is of the type which comprises a discharge space and a mercury free halide fill included within the discharge space. The lamp may comprise electrodes or be electrodeless. The system comprises a voltage source, and a circuit structured and arranged to produce from voltage supplied by the voltage source, an acoustically modulated ballast without off-time and low power time. The circuit is adapted to be electrically connected to the discharge lamp. A method of producing a voltage, and such an acoustically modulated ballast, is also provided.

BRIEF DESCRIPTION OF THE DRAWINGS

This invention may be clearly understood by reference to the attached drawings in which.

MODE FOR CARRYING OUT THE INVENTION

For a better understanding of the present invention, together with other and further objects, advantages and capabilities thereof, reference is made to the following disclosure and appended claims taken in conjunction with the above-described drawings.

Figure 1:
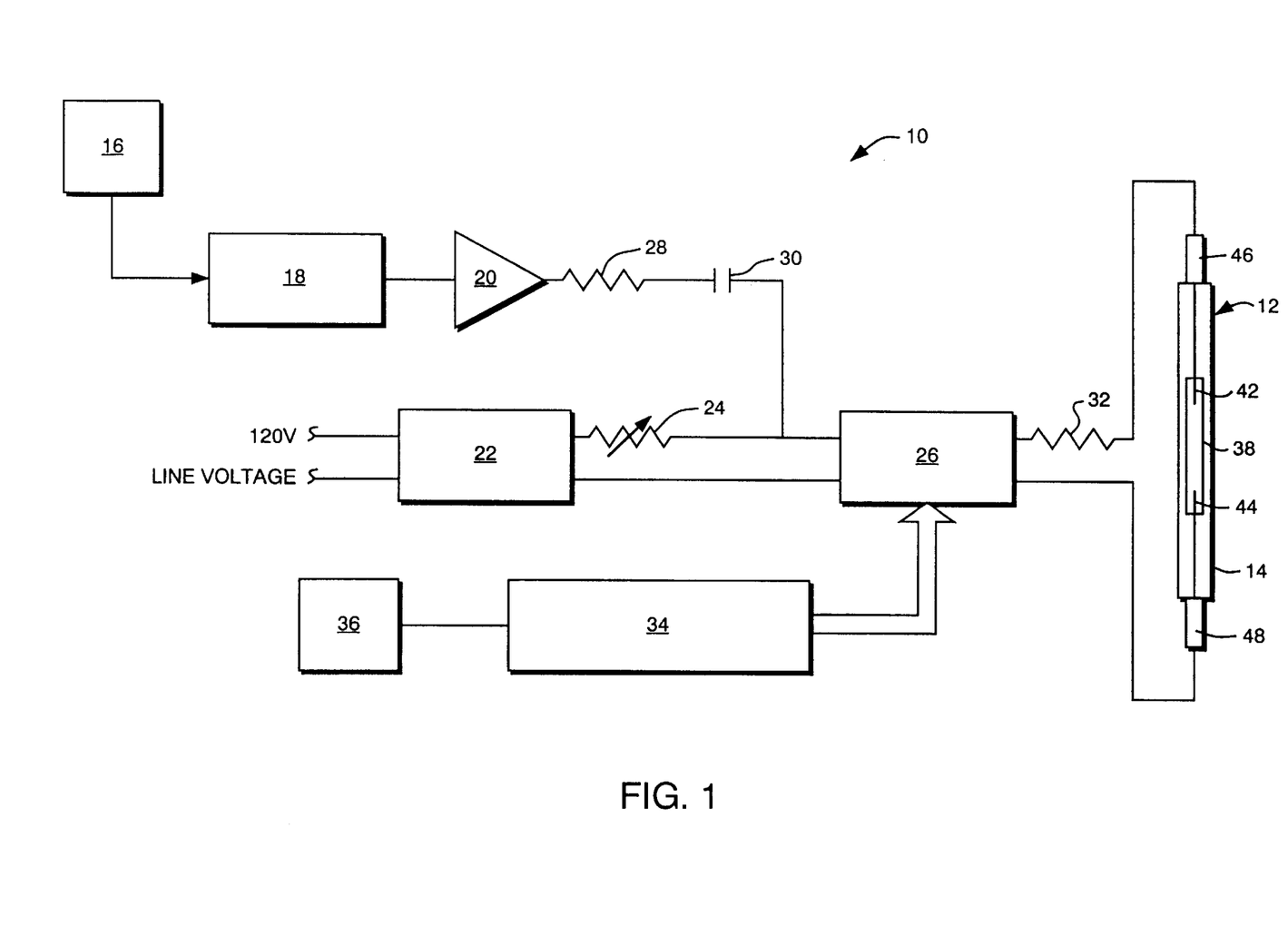
FIG. 1 is a circuit diagram of one embodiment of the present invention.

Referring to the drawings, FIG. 1 illustrates a system 10 in accordance with one embodiment of the present invention for the operation of a discharge lamp. The system 10 is provided for operating a high intensity discharge lamp 12 which, in operation, may be positioned horizontally, vertically or in any other orientation. The discharge lamp 12 may be contained in a sealed outer envelope 14 in a conventional manner, if desired. The envelope 14 is illustrated schematically in FIG. 1. The ballast used to operate lamp 12 is an acoustically modulated square ballast. Any such ballast with appropriate modulation may be used provided such ballast is without the "off-time" or low power time; that is, with zero crossing time being less than 10 microseconds, and preferably less than one microsecond. System 10 includes a function generator and power amplifier combination. In particular, a function generator, including a sweep ramp 16 and sine wave generator 18, is provided coupled to a power amplifier 20. A typical function generator, including a sweep ramp 16 and a sine wave generator 18, which can be employed is a Model No. BK3020 manufactured by BK Precision. A typical power amplifier 20 which can be used is a Model No. 1140LA, manufactured by ENI.

Figure 2A:
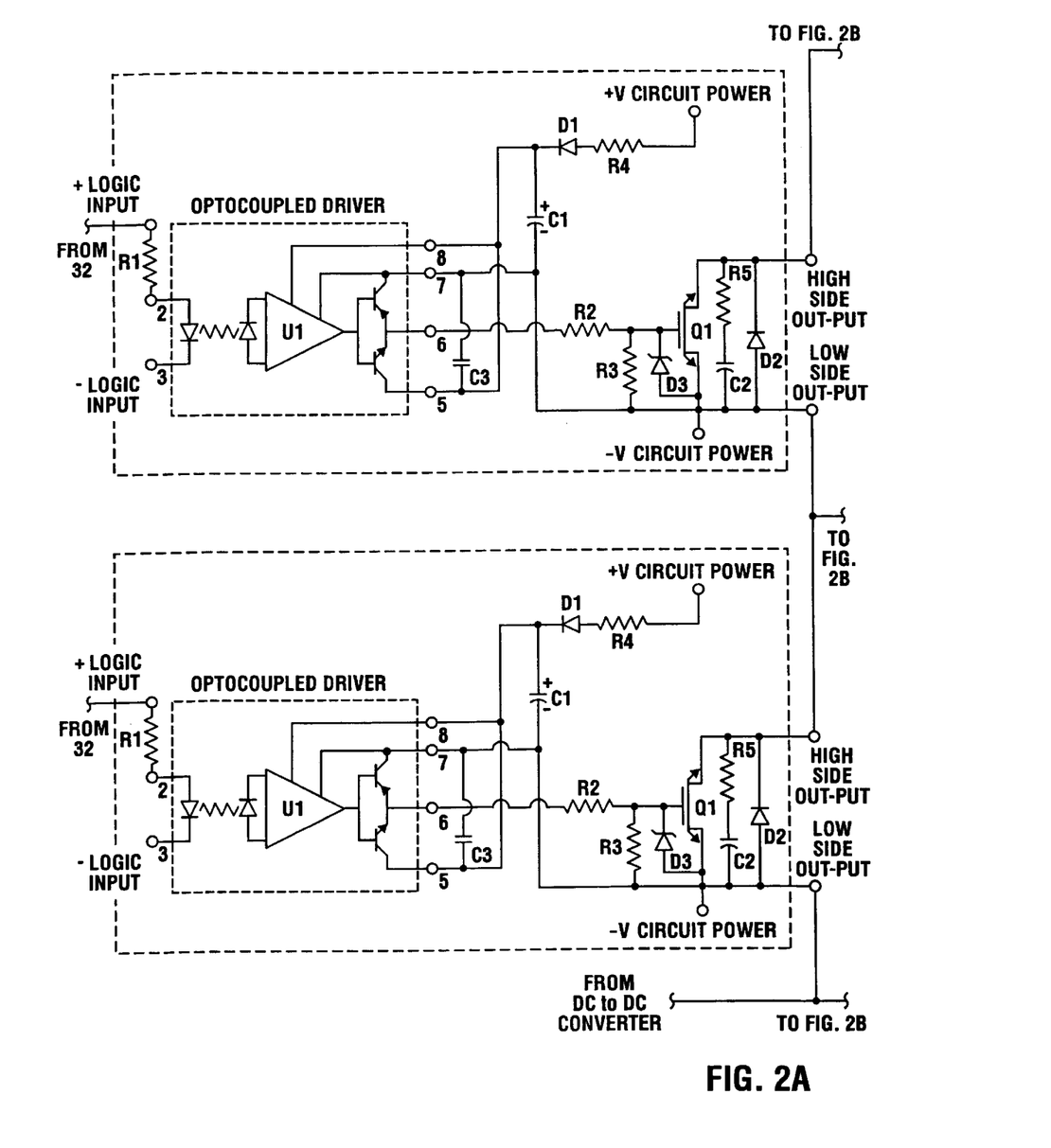
FIGS. 2A and 2B are a circuit diagram of an H-bridge commutator useful in the present invention.
Figure 2B:
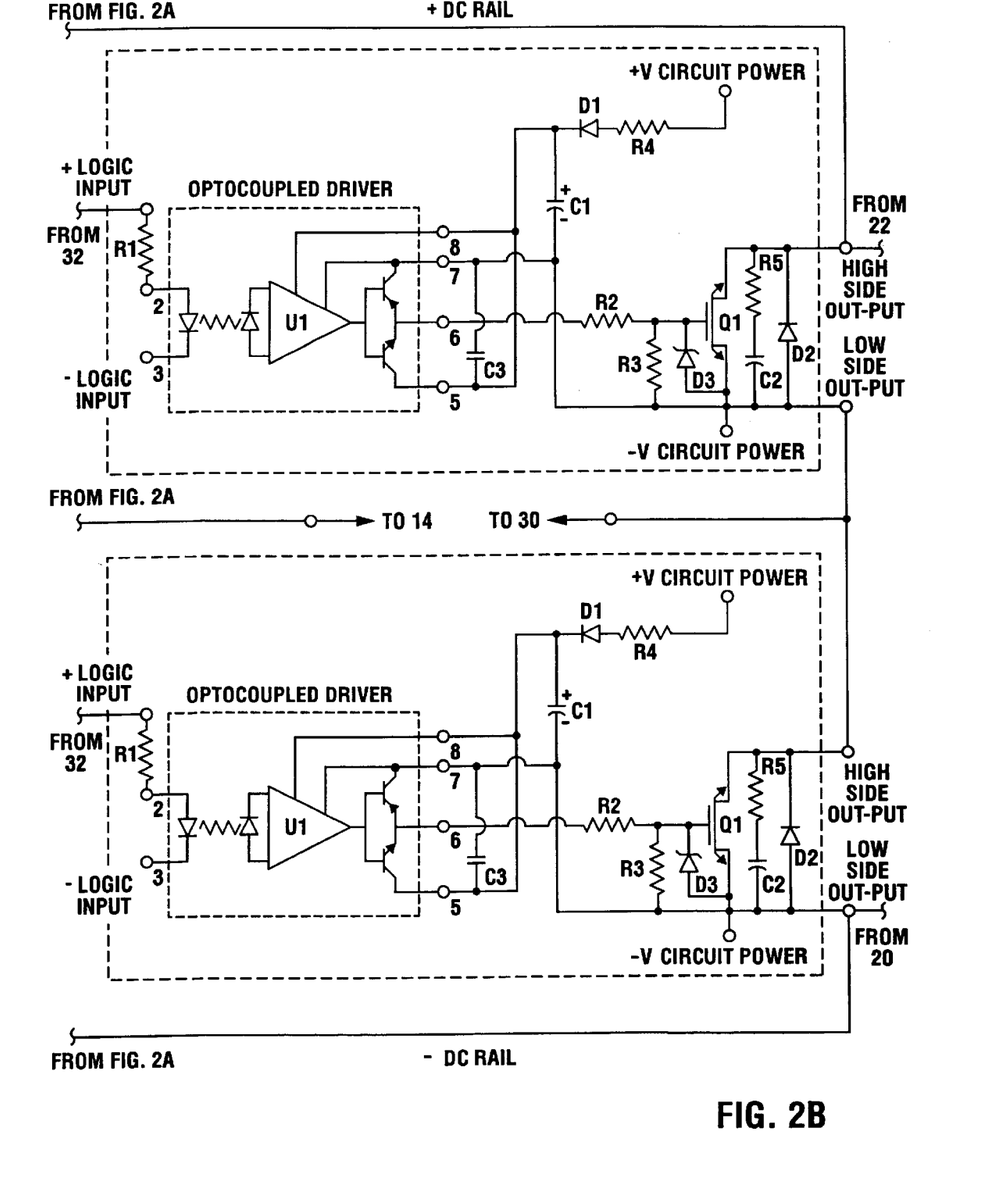
Figure 3:
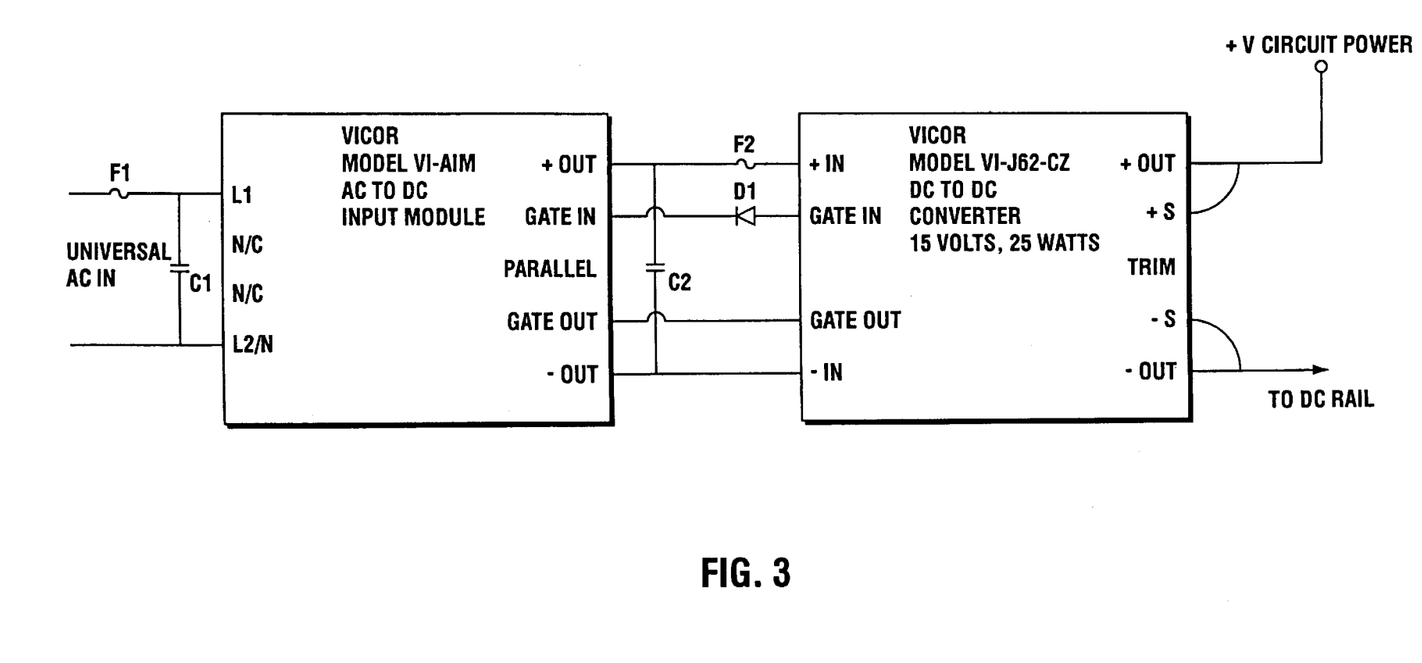
FIG. 3 is a circuit diagram of a dc circuit supply of the H-bridge commutator of FIGS. 2A and 2B.

The system 10 includes a dc power supply and resistor ballast combination. In particular, dc power supply 22 is coupled to a resistor 24 providing a series dc power supply and resistor ballast combination. A typical dc power supply 22 which can be used is a Model No. HP6035A, manufactured by Hewlett Packard. The resistor 24 is a conventional 25 Ohm non-inductive power resistor. A typical resistor 24 which can be used is a Model No. Pecos TC100PA10R00J, manufactured by Ohmite. The output of the ballast combination is capacitively coupled to the output of the function generator/power amplifier combination to provide a dc voltage which is fed to an H-bridge commutator 26. An example of the H-bridge commutator 26, and dc circuit supply for such commutator, which can be used is illustrated in FIGS. 2 and 3, respectively. The capacitive coupling is provided by a resistor 28 and capacitor 30. The resistor 28 is a conventional 30 Ohm non-inductive matching power resistor. A typical resistor 28 which can be used is a Model No. Pecos TC100PA10R00J, manufactured by Ohmite. The capacitor 30 is a conventional 1 $\mu$F capacitor. A typical capacitor 30 which can be used is a Model No. 1 $\mu$F/K 630V, manufactured by Sprague.

The H-bridge commutator 26 is operatively coupled to the lamp 12 through a conventional in-rush limiting resistor 32. A typical resistor 32 which can be used is a Model No. CL40, manufactured by Panasonic. A pulse generator 34 is coupled to the H-bridge commutator 26 for setting the timing of the H-bridge commutator. To this end, a conventional Hewlett Packard lap top computer 36 may be coupled to the pulse generator 34 to provide the desired instructions in a conventional manner. A typical pulse generator 34 which can be used is a Model No. DG535, manufactured by Stanford Research.

The system 10 provides one embodiment of the present invention useful in controlling a lamp system by (a) supplying a discharge lamp with an input waveform to power the discharge lamp, and (b) injecting acoustic frequencies into the power waveform supplied to the discharge lamp in the absence of off-time and low power time.

The discharge lamp 12 includes a conventional sealed arc tube 38 which defines a discharge space therein. The arc tube 38 may be transparent or translucent, as desired. A mercury free halide fill is included within the discharge space in a conventional manner.

The discharge lamp of the present invention includes at least one electrode sealed therein for establishing an arc discharge. For example, the arc tube 38 comprises two electrodes 42 and 44 sealed therein at opposite ends in a conventional manner. Each electrode is adapted to be electrically connected to a respective connector 46 and 48 thereby electrically connecting the arc tube 38 to the H-bridge commutator 26.

In considering the operation of the system illustrated in FIG. 1, in order to inject acoustic frequencies into the power waveform supplied to the arc tube 38, the function generator 16, 18 is tuned to the desired frequencies. The specific frequencies will vary depending upon lamp features such as the dimensions and geometry of the arc tube and the temperature and composition of the enclosed fill. In other words, the frequencies will vary from lamp to lamp as one or more of these features vary.

Figure 4:
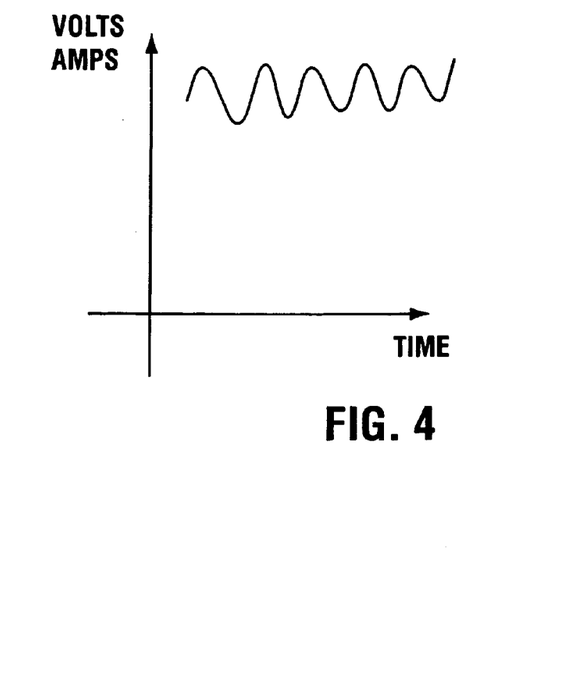
FIG. 4 is a graph illustrating a ripply d.c. voltage formed in one embodiment of the present invention.
Figure 5:
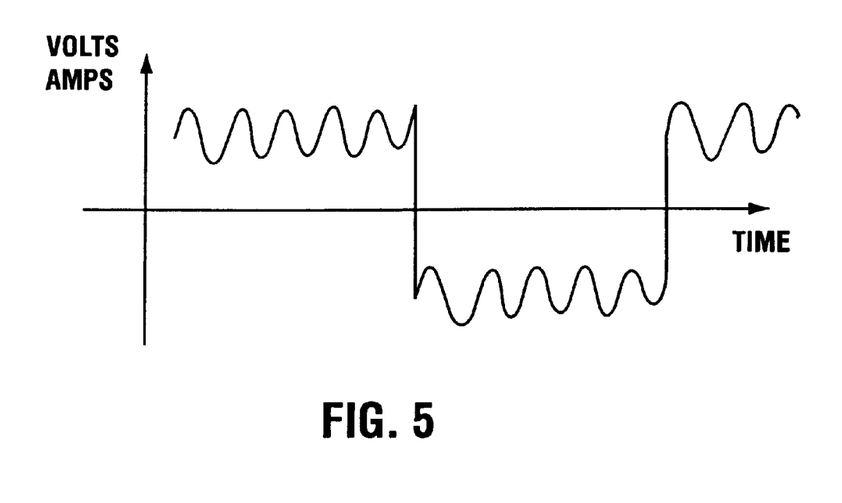
FIG. 5 is a graph illustrating an acoustically modulated square wave ballast waveform formed in one embodiment of the present invention.

Regardless of the specifics of the lamp features, however, a mercury free high intensity discharge lamp may be positioned in any orientation during operation thereof, by imposing the particular acoustic frequency components in the power waveform applied to the lamp as described herein. To this end, in considering the embodiment illustrated in FIG. 1, the function generator 16, 18 is tuned to the desired acoustic frequencies. A ripply dc voltage as illustrated in FIG. 4 is provided at an input of the H-bridge commutator 26 by capacitively coupling the power amplified swept acoustic waveform provided by the tuned function generator 16, 18 and power amplifier 20 to the output of the series DC supply and resistor ballast combination 22, 24. Such capacitive coupling is provided by the resistor 28 and capacitor 30. In turn, the H-bridge commutator 26 will produce an acoustically modulated square wave ballast waveform as illustrated in FIG. 5 which will be fed to the arc tube 38 through the resistor 32 which provides the conventional in-rush limit. An example of the H-bridge commutator 26 is illustrated in FIGS. 2A and 2B (the component values for FIGS. 2A and 2B are listed in Table I). An example of a dc circuit supply for such commutator is illustrated in FIG. 3 (the component values for FIG. 3 are listed in Table II). Operation of system 10 using an appropriately modulated ballast waveform in order to inject acoustic frequencies provides an arc tube wall temperature profile which is well within the survival region for quartz and provides a lamp system which will have longevity, improved photometric results and be capable of operating in any orientation without change in electrical characteristics or light output.

TABLE I

| | |
|---|---|
| R1 | 240 ohms |
| R2 | 100 ohms |
| R3 | 1000 ohms |
| R4 | 10 ohms |
| R5 | 110 ohms, 2 watts |
| D1 and D2 | MUR 8100 |
| D3 | 18 volt zener |
| BR1 | RS404L |
| VR1 | Varistor 420L20 |
| C1 | 100 µf 50 V |
| C2 | 100 pf |
| C3 | 0.1 µf ceramic |
| Q1 | IRGPH40F (IGBT) |
| U1 | HP3101 |

TABLE II

| | |
|---|---|
| F1 | 5 amps |
| F2 | 2 amps |
| C1 | 0.47 µf, 200 VAC |
| C2 | 270 µf, 200 VDC |

TABLE II-continued

| | |
|---|---|
| D1 | 1N4006 |

EXAMPLE 1

A system was provided including the specific components described above coupled to a mercury free metal halide high intensity discharge lamp. The lamp included a 400 Watt sealed arc tube having a discharge space containing a mercury free halide fill which consisted essentially of the composition $DyI_3/HoI_3/TmI_3/NaI/TlI$ in a molar ratio of 1.0/1.0/1.0/6.0/0.75. The outer diameter of the arc tube was 10 mm (8 mm I.D.) and the tips of electrodes contained therein were spaced to provide an arc length of 8 mm. The ballast illustrated in FIG. 1 was powered in a conventional manner using the dc power supply 22. The lamp provided reasonable efficacy and color as noted below when operated in a horizontal orientation:

| | |
|---|---|
| Lumens Per Watt (LPW) | 90 |
| Average ($R_1$–$R_9$) Color Rendering Index (CRI $R_A$) | 80 |
| $R_9$ Color Rendering Index (CRI $R_9$) | –20 |
| Correlated Color Temperature at 400 W. (CCT) | 4000 |

However, the lamp could not be operated satisfactorily when oriented in any other manner such as when oriented vertically. For example, when oriented vertically, the arc was destabilized and pushed towards the glass of the arc tube. The color was noticeably asymmetrical top to bottom, the top of the lamp being dim and the bottom of the lamp being bright. The arc tube wall temperature profile was within the survival region for quartz but only when the lamp was oriented horizontally. The arc tube overheated and failed at the rated power when the lamp was oriented vertically, the lamp therefore not universally burning.

EXAMPLE 2

Figure 6:
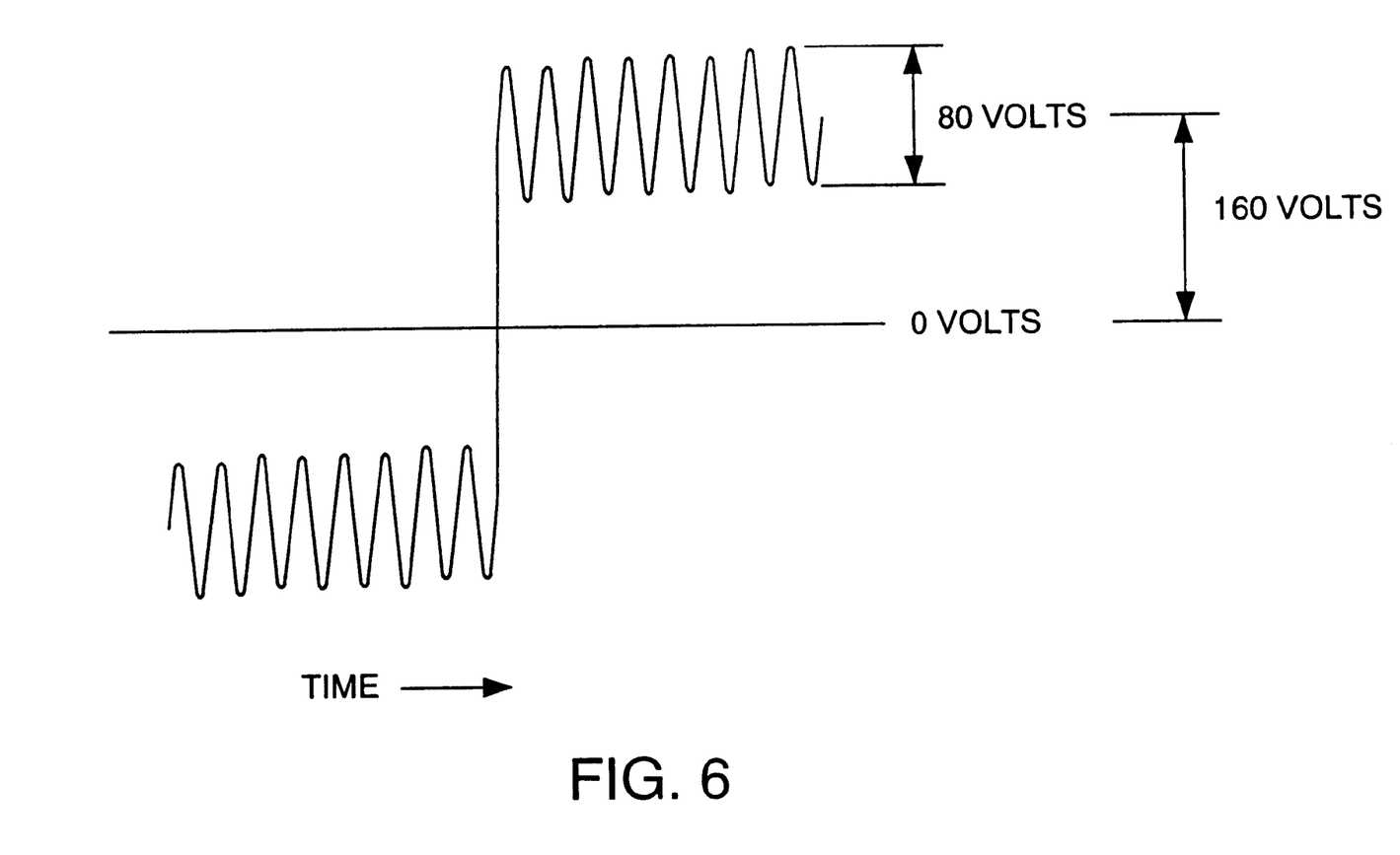
FIGS. 6 and 7 are graphs illustrating the voltage and current waveforms, respectively, fed to one example of a lamp provided in one embodiment of a system of the present invention.
Figure 7:
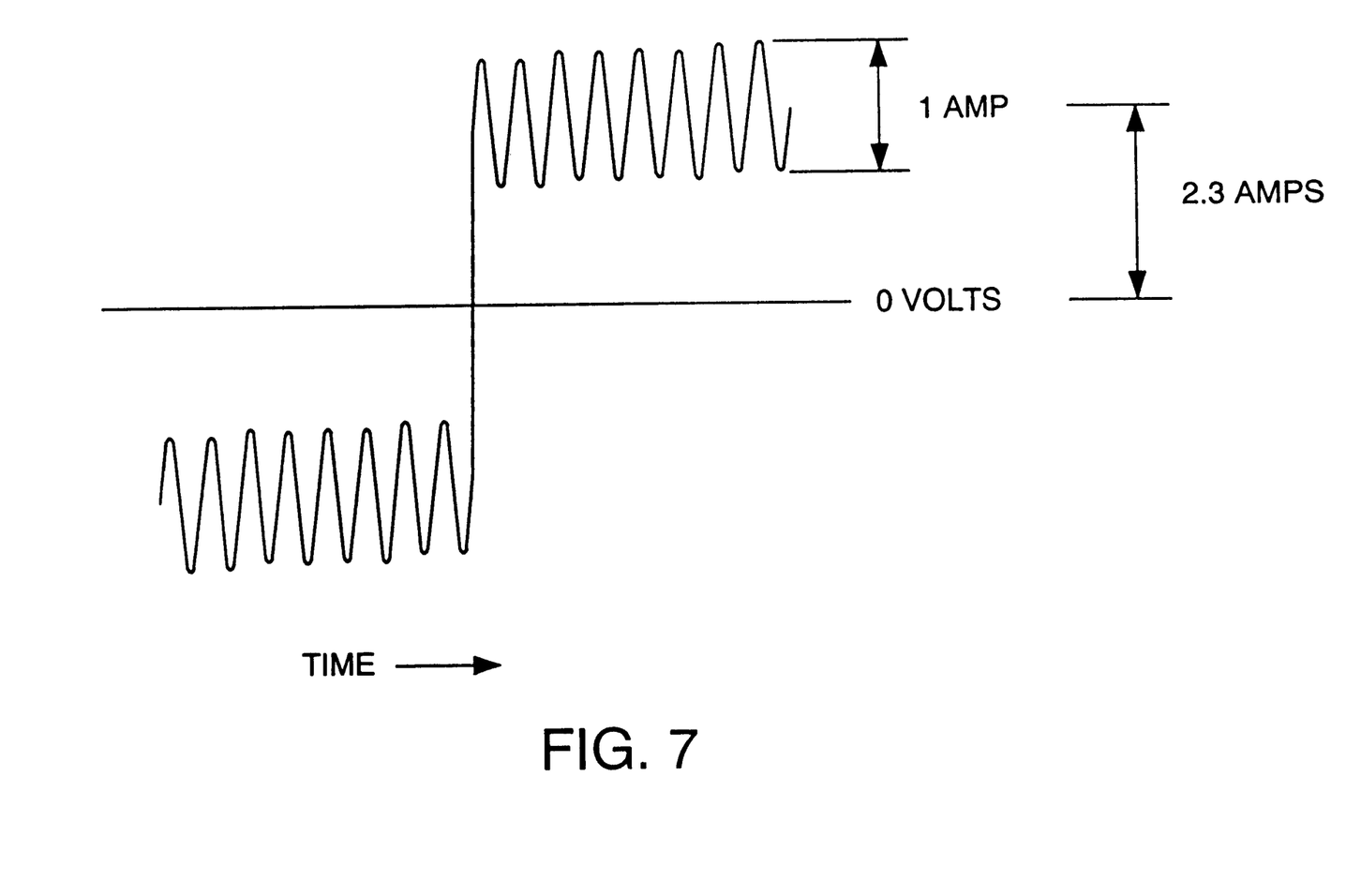

The identical system provided in EXAMPLE 1 was altered solely by effecting an acoustically modulated ballast. In particular, the lamp was operated on a 400 Watt acoustically modulated square wave ballast without the "off-time" or low power time; that is, less than 10 microsecond, and preferably less than one microsecond. To this end, the function generator was tuned to a 1 kHz sweep rate and a starting frequency of about 60 kHz. The range of frequency was about 50 to 71 kHz. A schematic of the voltage and current waveforms fed to the lamp by the H-bridge commutator through the in-rush resistor is illustrated in FIGS. 6 and 7, respectively. It will be noted that at 160 volts and 2.3 amps, the waveforms are symmetric at zero. Under these conditions, the arc became centered and separated itself into many segments along the length of the arc tube. The number of segments varied as the frequency of the driving signal changed. For example, as the frequency range increased, the number of segments increased (multimode). Controlling the number of cells in multimode operation was found to be difficult In single mode (one cell) operation, the arc appeared straight and centered along the length of the tube. The lamp provided improved photometric results including improved efficacy and color as noted below:

| | |
|---|---|
| Lumens Per Watt (LPW) | 95 |
| Average ($R_1$–$R_9$) Color Rendering Index (CRI $R_A$) | 82 |
| $R_9$ Coloring Rendering Index (CRI $R_9$) | 0 |
| Correlated Color Temperature at 400 W. (CCT) | 3700 |

In addition to superior efficacy and better color, the arc was stable and straight, and the asymmetry of the color was reduced. The lamp achieved these objectives at any orientation without change in electrical characteristics or light output. In other words, the lamp was universally burning when operated on a modulated ballast waveform as described herein. The arc tube wall temperature profile was well within the survival region of quartz in any operating position of the arc tube. The temperature profile suggests that the lamp will have longevity. Such improved results are obtained in combination with the environmentally attractive feature of providing a lamp which does not contain mercury.

The embodiments which have been described herein are but some of several which utilize this invention and are set forth here by way of illustration but not of limitation It is apparent that many other embodiments which will be readily apparent to those skilled in the art may be made without departing materially from the spirit and scope of this invention.

We claim:

1. Method of operating a high intensity discharge lamp which, in operation, may be positioned in any orientation, wherein said discharge lamp comprises a discharge space and a mercury free metal halide fill included within said discharge space, said discharge lamp being adapted to be electrically connected to a power source, said method comprising the steps of:

producing a voltage; and producing from said voltage an acoustically modulated ballast without off-time and without low power time, said acoustically modulated ballast being adapted to be supplied to said discharge lamp to provide said power source.

2. The method of claim 1 wherein said step of producing an acoustically modulated ballast comprises the step of producing an acoustically modulated square wave ballast.

3. The method of claim 2 wherein the step of producing said voltage comprises the step of producing a ripply DC rail voltage.

4. The method of claim 1 wherein said fill consists essentially of the composition of $DyI_3$/$HoI_3$/$TmI_3$/NaI/TlI in a molar ratio of 1.0/1.0/1.0/6.0/0.75.

5. The method of claim 3 wherein said step of producing a ripply DC rail voltage comprises the step of capacitively coupling a power amplified swept acoustic waveform to a series DC supply and resistor ballast combination.

6. The method of claim 5 wherein said step of producing said acoustically modulated square wave ballast comprises the step of supplying said ripply DC rail voltage to an H-bridge commutator.

7. The method of claim 6 wherein said fill consists essentially of the composition of $DyI_3$/$HoI_3$/$TmI_3$/NaI/TlI in a molar ratio of 1.0/1.0/1.0/6.0/0.75.

8. A system for the operation of a high intensity discharge lamp, said discharge lamp, in operation, being positioned in any orientation, said discharge lamp being of the type comprising a discharge space, and a mercury free halide fill included within said discharge space, and being adapted to be electrically connected to a power source, comprising:

a voltage source; and a circuit structured and arranged to produce, from voltage supplied to said circuit by said voltage source, an acoustically modulated ballast without off-time and without low power time, said circuit being adapted to be electrically connected to said discharge lamp to provide said power source.

9. The system of claim 8 wherein said circuit is structured and arranged to produce an acoustically modulated square wave ballast.

10. The system of claim 9 wherein said voltage source is structured and arranged to produce a ripply DC rail voltage.

11. The system of claim 8 wherein said fill consists essentially of the composition of $DyI_3$/$HoI_3$/$TmI_3$/NaI/TlI in a molar ratio of 1.0/1.0/1.0/6.0/0.75.

12. The system of claim 10 wherein said voltage source comprises a function generator and power amplifier first combination which is structured and arranged to produce a power amplified swept acoustic waveform; a series DC supply and resistor ballast second combination; and a capacitive coupling structured and arranged to capacitively couple said power amplified swept acoustic waveform to said second combination.

13. The system of claim 12 wherein said circuit comprises an H-bridge commutator.

14. The system of claim 13 said fill consists essentially of the composition of $DyI_3$/$HoI_3$/$TmI_3$/NaI/TlI in a molar ratio of 1.0/1.0/1.0/6.0/0.75.

15. The system of claim 8 further comprising said discharge lamp connected to said power source.

16. The system of claim 15 said fill consists essentially of the composition of $DyI_3$/$HoI_3$/$TmI_3$/NaI/TlI in a molar ratio of 1.0/1.0/1.0/6.0/0.75.

17. The system of claim 13 further comprising said discharge lamp.

18. The system of claim 17 said fill consists essentially of the composition of $DyI_3$/$HoI_3$/$TmI_3$/NaI/TlI in a molar ratio of 1.0/1.0/1.0/6.0/0.75.

* * * * *